United States Patent [19]

Iannicelli

[11] Patent Number: 4,713,225
[45] Date of Patent: * Dec. 15, 1987

[54] METHOD FOR REMOVING ORGANIC REDUCED SULFUR COMPOUNDS

[75] Inventor: Joseph Iannicelli, Jekyll Island, Ga.

[73] Assignee: Aquafine Corporation, Brunswick, Ga.

[ * ] Notice: The portion of the term of this patent subsequent to Nov. 12, 2002 has been disclaimed.

[21] Appl. No.: 764,740

[22] Filed: Aug. 12, 1985

Related U.S. Application Data

[63] Continuation-in-part of Ser. No. 574,285, Feb. 26, 1984, abandoned.

[51] Int. Cl.$^4$ .................. C01B 17/16; C01B 31/20; C01B 17/00; B01J 8/00
[52] U.S. Cl. .................................. 423/230; 423/242; 423/244
[58] Field of Search ........... 423/242 A, 242 R, 244 R, 423/244 A, 230, 245 R, 245 S

[56] References Cited

U.S. PATENT DOCUMENTS

| | | | |
|---|---|---|---|
| 2,837,170 | 6/1958 | Armstrong et al. | 183/51 |
| 2,926,999 | 3/1960 | Tarbutton et al. | 23/178 |
| 2,984,545 | 5/1961 | Tarbutton et al. | 23/178 |
| 3,150,923 | 9/1964 | Bienstock et al. | 23/2 |
| 3,226,192 | 12/1965 | Atsukawa et al. | 23/167 |
| 3,330,096 | 7/1967 | Zimmerley | 55/73 |
| 3,492,083 | 1/1970 | Lowicki et al. | 23/2 |
| 3,761,570 | 9/1973 | Lowicki et al. | 423/225 |
| 3,798,310 | 3/1974 | Atsukawa et al. | 423/244 |
| 3,898,320 | 8/1975 | Atsukawa et al. | 423/244 X |
| 4,076,793 | 2/1978 | Nikolai | 423/242 |
| 4,164,545 | 8/1979 | Scott | 423/239 |
| 4,207,291 | 6/1980 | Byrd et al. | 422/122 |
| 4,283,374 | 8/1981 | Erickson | 423/244 |
| 4,522,735 | 11/1985 | Iannicelli et al. | 423/224 |
| 4,552,734 | 11/1985 | Iannicelli et al. | 423/244 |

FOREIGN PATENT DOCUMENTS

| | | |
|---|---|---|
| 46-2641 | 1/1971 | Japan . |
| 597254 | 1/1948 | United Kingdom . |
| 719056 | 11/1954 | United Kingdom . |
| 1576534 | 10/1980 | United Kingdom . |

OTHER PUBLICATIONS

Sewell, "Assessment of Some Solid Filters for Removing Hydrogen Sulphide and Sulphur Dioxide from Air", Report No. C.D. 2168, Chemistry Division, Department of Scientific and Industrial Research, New Zealand, Nov. 1973.

Hudson et al., "Hydrogen Sulfide Adsorption by Manganese Dioxide and Activated Carbon, Environmental Science and Technology, vol. 8, No. 3, Mar. 1974, pp. 238–243.

Turkdogan et al., "Desulfurization of Hot Reducing Gases with Maganese Oxide Pellets", Proceedings International Iron and Steel Congress, 3rd, American Society of Metallurgists, Ohio (1979).

Gmelin: Handbuch der anorganischen Chemie, i. Auflage (1973) Mangan IV Oxide, p. 306.

Chem. Abstracts 1958 No. 9481D.
Chem. Abstracts 1960, No. 9225C.
Chem. Abstracts No. 49512C.

Lal, "On the Action of Hydrogen Sulphide on Manganese Dioxide", Jour. Indian Chem. Soc., vol. 29, No. 12, 1952, pp. 934–936.

Uno et al., "Scale-Up of a $SO_2$ Control Process", Chemical Engineering Program, vol. 66, No. 1, Jan. 1970, pp. 61–65.

Primary Examiner—Gregory A. Heller
Attorney, Agent, or Firm—Banner, Birch, McKie and Beckett

[57] ABSTRACT

A foraminous filter useful for removing particulates from a gas being flowed therethrough having impregnated therein a manganese dioxide absorbent active for removal of Total Reduced Sulfur compounds from the gas.

5 Claims, No Drawings

METHOD FOR REMOVING ORGANIC REDUCED SULFUR COMPOUNDS

This application is a continuation-in-part of Ser. No. 574,285, filed Feb. 26, 1984 and now abandoned.

BACKGROUND OF THE INVENTION

1. Field of the Invention

The present invention relates to a foraminous filter useful for removing Total Reduced Sulfur compounds (TRS), especially $H_2S$ and mercaptans, and other oxidizable constituents from gases, as well as to a method for preparing the filter. More particularly, the present invention relates to a foraminous filter having an active form of manganese dioxide impregnated therein as an oxidative absorbent for Total Reduced Sulfur compounds.

2. Description of the Prior Art

Various processes and absorbents have been proposed for reducing the content of sulfur compounds in gases. Most of these processes and absorbents relate to the large-scale removal of sulfur compounds from industrial gases and particularly pertain to the removal of sulfur oxides. Because of their substantial acidic character, these sulfur oxides are readily absorbed by alkaline absorbents, and can suitably be removed on an industrial scale. Unfortunately, these same absorbents are not generally satisfactory for removing a number of important industrial byproduct sulfur compounds such as hydrogen sulfide, mercaptans and other related organic sulfur containing compounds, since the acidic character of these compounds is generally much less pronounced. In fact, there presently is no process being used commercially for the large-scale removal of such sulfur compounds, particularly the mercaptans, from industrial gases.

In British Patent Specification No. 1,576,534 a process for removing hydrogen sulfide from a hot reducing gas is disclosed. The process uses an absorbent comprising a mixture of finely divided manganese oxide, i.e., manganese of oxidation state 2, and finely divided aluminum oxide. However, this patent does not disclose that the absorbent can remove mercaptans from gas streams.

U.S. Pat. No. 3,898,320 to Atsukawa uses a dry, powdered absorbent comprising a hydrated manganese oxide to remove sulfur oxides from gas streams. There is no indication that this absorbent can be used to remove $H_2S$ or reduced organic sulfur compounds, particularly mercaptans. As described, the sulfur oxides in the gas react with the hydrated manganese oxide absorbent to produce manganese sulfate. The manganese sulfate is subsequently solubilized in water, converted to manganese hydroxide in the presence of ammonium hydroxide and is thereafter reconverted to the hydrated absorbent by oxidation with an oxygen-containing gas.

U.S. Pat. No. 3,492,083 to Lowicki, et al., describes a process for removing sulfur containing compounds such as sulfur oxides and including $H_2S$ and organic sulfur compounds which employs a complex multicomponent absorbent. This absorbent includes a metal oxide, hydrated oxide or hydroxide or preferably mixtures thereof, for example, manganese dioxide and magnesium oxide, in combination with an alkali metal or alkaline earth metal oxide or hydroxide, for example, sodium hydroxide.

Because of the lack of any commercially viable process for the large-scale removal of reduced sulfur compounds such as $H_2S$ and particularly mercaptans, residential and commercial communities in the proximity of industrial facilities such as kraft paper mills, sewage treatment plants, oil refineries and the like commonly are subjected to pollution from such sulfur compounds. This pollution is a particular nuisance since these compounds are extremely odorous, having an easily detected, pungent odor at low concentrations. In fact, although odor perception varies from one individual to another, based upon many factors, these compounds can sometimes be detected at concentrations as low as one part per billion (ppb). Moreover, although atmospheric conditions (e.g., wind and rain) often may dissipate the odor causing contaminants in the air outside of residential and commerical establishments, once such contaminants have diffused inside, the odors tend to remain for protracted periods.

It is an object of the present invention therefore to provide a filter useful for removing $H_2S$ and organic sulfur-containing compounds, particularly mercaptans, from a gas, particularly air.

It is another object of this invention to provide a filter useful for removing the aforementioned sulfur compounds from air that can readily be adapted to residential and small commercial applications.

It is a further object of this invention to provide a process for preparing a filter useful for removing these sulfur compounds from a gas.

It is still an additional object of the present invention to provide a method for removing organic sulfur-containing compounds from a gas stream.

SUMMARY OF THE INVENTION

These and other objectives which will readily occur to those skilled in the art are achieved by the present invention which comprises a foraminous filter useful for removing particulates from a gas being flowed therethrough having impregnated therein an essentially crystalline manganese dioxide obtained by oxidizing maganese (II) hydroxide which had previously been precipitated throughout the filter by reacting manganese (II) ions with ammonia, said manganese dioxide being active for removal of Total Reduced Sulfur compounds from said gas.

The present invention also provides a method for preparing a filter useful for removing Total Reduced Sulfur compounds from a gas comprising:

(a) providing filter material, from which a foraminous filter useful for removing particulates from a gas being flowed therethrough is prepared;

(b) saturating said filter material with an aqueous solution of manganese (II) ions;

(c) reacting said manganese (II) ions with ammonia to precipitate manganese (II) hydroxide on said filter material; and (d) oxidizing said precipitated manganese (II) hydroxide to produce an essentially crystalline manganese dioxide active for removal of Total Reduced Sulfur compounds.

The present invention additionally provides a method for removing organic sulfur-containing compounds from a gas stream comprising:

(a) providing a foraminous filter useful for removing particulates from a gas being flowed therethrough having impregnated therein manganese dioxide active for removal of said organic sulfur-containing compounds, and (b) flowing a gas stream containing said organic sulfur-containing compounds through said filter whereby said organic sulfur-containing compounds are removed from said gas stream.

DESCRIPTION OF THE INVENTION

As used in the specification, the term "industrial gas" refers to gases produced as products or byproducts in industrial processing facilities which contribute to environmental pollution including, for example, waste gases from sewage treatment facilities, pulping mills, petroleum refineries, and other chemical manufacturing and refining installations.

The term "Total Reduced Sulfur compounds" herein refers in general to sulfur compounds having no substantial acidic character and includes, inter alia, $H_2S$, mercaptans such as methylmercaptan, butylmercaptan and the like, organic sulfides such as dimethyl sulfide, dimethyl disulfide, dimethyl sulfoxide and similar materials such as homologs of the foregoing. These Total Reduced Sulfur (TRS) compounds are typically toxic and/or odorous contaminants of various industrial gases.

The terms "manganese dioxide" or "$MnO_2$" as used in the specification and claims refer to manganese dioxide active for removing TRS compounds from a gas (e.g., air). Active $MnO_2$, for example, can be prepared by oxidizing freshly precipitated manganese (II) hydroxide prepared by reacting manganese (II) ions with ammonia. This term also includes materials which have an oxygen content below exact stiochiometric amounts, i.e., slightly less than 2 oxygen atoms for each manganese atom. Moreover, it is to be understood that the formula and term also cover compounds which may be partially hydrated. For convenience, all these $MnO_x$ materials active for removal of TRS compounds from a gas are simply referred to as $MnO_2$ or manganese dioxide.

In one embodiment of this invention, a conventional pre-fabricated foraminous filter used for removing entrained particulates from an air stream flowed therethrough, e.g., in residential and commercial air-conditioning systems, is treated to render the filter active for removing TRS compounds and other oxidizable gases from air, i.e., the filter is impregnated with active manganese dioxide.

Any of a wide variety of conventional foraminous fiber filters or foam filters can be treated in accordance with this invention to yield a filter active for removal of TRS compounds. Suitable filters include fiberglass filters, fabric filters, such as, melt blown polymer webs and filters prepared from natural fibers including for example cellulosic fibers are proteinaceous fibers, (e.g., horse hair), polyurethane foam filters (e.g., polyurethane foam prepared from polyester or polyether polyols), and filters prepared from metal fibers (e.g., steel wool). These filters present a tortuous flow path for gases which are flowed therethrough. Initially, the filter is saturated with an aqueous solution containing manganese (II) ions. Saturation of the filter conveniently can be accomplished by spraying or dipping the filter using an aqueous solution of manganese (II) sulfate ($MnSO_4$). Other procedures and other reagents providing an aqueous solution containing manganese (II) ions will be apparent to those skilled in this art.

The saturated filter then is treated with a source of ammonia so as to precipitate manganese (II) hydroxide ($Mn(OH)_2$) throughout the filter. Ammonia preferably is added as an aqueous solution, which can also be applied to the filter by spraying or dipping. Preferably, a concentrated ammonia solution (approximately 28% w/w) is used. It is also possible to treat the filter with the manganese (II) ion source and the ammonia source simultaneously. Simultaneous treatment is accomplished conveniently by treating the filter with a freshly prepared mixture of an aqueous solution containing manganese (II) ions, e.g., an aqueous solution of manganese (II) sulfate, and an aqueous ammonia solution. This mixture should not be permitted to stand for prolonged periods before use, so as to avoid premature precipitation of manganese (II) hydroxide. It is also possible to treat the filter material, having been saturated previously with an aqueous solution of manganese (II) ions, with ammonia vapor to precipitate manganese (II) hydroxide. Other procedures and reagents for reacting a source of manganese (II) ions with ammonia so as to impregnate a foraminous filter will be apparent to those skilled in the art.

The precipitated manganese (II) hydroxide then is oxidized to produce an essentially crystalline active manganese dioxide using an appropriate oxidizing agent whereby the active manganese dioxide is impregnated in the filter material. Oxidation can be accomplished, for example, by flowing a stream of air, optionally heated, through the filter. The air stream also dries the filter. It is also possible to use other oxidizing agents besides an oxygen-containing gas, e.g., air, to convert the freshly precipitated manganese (II) hydroxide to manganese dioxide. For example, oxidants such as sodium persulphate and sodium hydrochlorite also can be used. These oxidants can be sprayed on the treated filter or can be included as a component in one of the aqueous treating media. Further oxidation of precipitated manganese (II) hydroxide also can be accomplished simultaneously with the filter's use for removing TRS compounds from a oxygen-containing gas stream such as air. In order to maximize the amount of active manganese dioxide on the filter, the treated filter preferably is oxidized contemporaneously with the precipitation of manganese (II) hydroxide. Other suitable oxidizing agents will be apparent to one skilled in this art.

The manganese dioxide impregnated filter then is inserted into a conventional residential or commercial air conditioning system and, in addition to particulates, the foraminous filter now removes TRS compounds and other oxidizable gases from the air flowed therethrough. The length of service of a given filter to some extent depends upon the quantity and quality of active $MnO_2$ impregnated in the fresh filter and its exposed area. Generally, loadings of $MnO_2$ between about 0.5 and 20 mg/cc of filter are used. Lower loadings lead to lower removal levels and a shorter life while higher loadings represent less efficient use of absorbent. Higher loadings also may be limited by the preparation procedure.

While it is possible to regenerate a spent filter, it generally is more convenient and sometimes more economical within the broad practice of this invention, to simply replace a TRS-loaded filter with a new filter. To regenerate a TRS-loaded filter, it first is treated with a source of ammonia, e.g., an aqueous ammonia solution, and then is oxidized. Procedures and reagents initially used to prepare the MnO$_2$ impregnated filter can advantageously be used to regenerate a loaded filter.

In addition to impregnating a pre-fabricated filter with active MnO$_2$, it is also possible to pretreat filter material using the procedure of this invention followed by fabricating a foraminous filter from the pretreated material. The so-prepared filter then is useful for removing both particulates and TRS compounds from a gas being flowed therethrough.

While not wishing to be bound by any particular theory, applicant believes that active manganese dioxide formed by oxidizing freshly precipitated manganese (II) hydroxide is impregnated throughout the foraminous filter as a thin coating of minute particles or as a continuous or semi-continuous sheath or film. This structure provides an extended area of active MnO$_2$ that accounts for the high removal of TRS compounds observed with filters treated in accordance with this invention. As used in the specification and claims, the phrases "impregnated therein", "impregnated throughout" and the like embrace the above-described structures for the essentially crystalline active manganese dioxide as well as other structures wherein an active manganese dioxide is fixed within a filter (e.g., on the surface of filter material), by oxidizing freshly precipitated (in-situ) manganese (II) hydroxide prepared by reacting manganese (II) ions with ammonia. The so-impregnated active manganese dioxide is not entrained into a gas stream flowing through the filter during use and cannot be removed simply by mechanical shaking.

The following examples are intended to illustrate more fully specific embodiments of the present invention without acting as a limitation on its scope.

EXAMPLE 1

A commercially available fiberglass filter adapted for use in a residential or commercial air-conditioning system was washed in an aqueous solution containing 0.01% (by weight) detergent, and excess moisture was thereafter removed. The filter then was immersed in an aqueous mixture of manganese (II) sulfate (MnSO$_4$.4-H$_2$O) and ammonia containing one mole per liter of manganese sulfate and two moles per liter of ammonium hydroxide. The filter was soaked in the solution for about five minutes, and then was removed, and blotted with paper to remove excess solution. Then, the filter was exposed to a stream of ambient temperature air for 30 minutes, which completely dried the filter and oxidized the freshly precipitated manganese (II) hydroxide coating to active manganese dioxide.

The MnO$_2$ impregnated filter prepared by the above procedure then was installed in the air return circuit of an air conditioning system. While the system was operating, a small capillary tube containing one-tenth milliliter of butylmercaptan (n-butanethiol) was broken in the air stream approximately 24 inches in front of the MnO$_2$ impregnated filter. No odor of the mercaptan could be detected in the air that emerged downstream of the filter. It is surprising that substantially total removal of the reduced sulfur compound was obtained in a single pass through the dry filter.

For comparison, the MnO$_2$ impregnated filter was removed from the duct and was replaced with an identical filter that had not been impregnated with active manganese dioxide was described above. When another vial of butylmercaptan (n-butanethiol) was broken before the filter, a very powerful and disagreeable mercaptan odor was detected throughout the building in which the air circulated.

EXAMPLE 2

The procedure of Example 1 was repeated using a felt of "medium" stainless steel wool (12"×12"×0.25") as the filter. After impregnation in manganese (II) sulfate/aqueous ammonia solution and air oxidation, the stainless steel wool fibers were visually coated with a brown stain of active manganese dioxide. The MnO$_2$ impregnated stainless steel wool felt was inserted into a cylindrical canister sealed at both ends and provided with perforations on its inner and outer surfaces. A small vial of butyl mercaptan was broken and placed in the center of the filter and air was introduced at one end for flow therethrough. No mercaptan odor was detected in the filtered air that emerged from the exterior surface of the air filter. Afterwards, the test was repeated using untreated stainless steel felt, and a strong mercaptan odor was detected in the air that passed through the filter.

EXAMPLE 3

This example demonstrates a process for treating filter material prior to filter fabrication. A spool of wool yarn was drawn through the manganese (II) sulfate/ammonia solution described in Example 1 and the yarn then was passed between the nip of two rollers designed to blot off excess liquid. The yarn was dried and air-oxidized according to the procedure in Example 1. The yarn then was cut into 3" sections and fabricated into a felt by slurrying the fibers in water and filtering then through a paper filter under vacuum. After drying, the resulting felt was placed on a Buchner funnel and a stream of air was blown through the conical portion of the funnel. A cylinder containing hydrogen sulfide was opened slightly in front of the funnel. No odor could be detected downstream of the filter. Further, a test with lead acetate paper was negative. When the test was repeated using unmodified yarn felt, a strong odor of hydrogen sulfide was detected downstream of the filter.

EXAMPLE 4

Repeating the procedure of Example 1, a cellulosic filter mat (Shure Filter II manufactured by Facet Enterprises of Henderson, N.C.) was impregnated with active MnO$_2$. The filter loading was approximately 14 mg of MnO$_2$ per cubic centimeter of filter. The MnO$_2$ impregnated filter was installed ahead of the fan in an air conditioning system for an office covering 1500 square feet. The office is located in an area where malodorous TRS contamination is prevalent. On those days where the odor of TRS compounds was very strong outside the office, operation of the air conditioning system with the MnO$_2$ impregnated filter successfully prevented such odors (TRS compounds) from polluting the office interior.

EXAMPLE 5

This example demonstrates that the composition of the active manganese dioxide obtained in accordance with the method of this invention differs from a manganese oxide composition obtained by using potassium permanganate as the manganese oxide source. Two manganese oxide impregnated filters were prepared using horse hair filter as the substrate. A first filter was prepared in accordance with the present invention by dipping the filter substrate into a saturated solution of manganese (II) sulfate having added thereto ammonium hydroxide. Then, excess solution was removed and the filter was exposed to a stream of ambient temperature air to dry the filter and oxidize the manganese hydroxide. There was a 11% loading of oxide coating. The oxidized coating appears tan to light brown. X-ray diffraction analysis of the filter substrate demonstrated that the manganese dioxide coating was essentially crystalline with distinct and sharp reflections at various crystallographic planes.

A second filter was prepared by dipping the filter substrate into a saturated aqueous bath of potassium permanganate at 100° F. for five minutes. The permanganate reacted with oxidizable material on the surface of the filter substrate forming a black manganese oxide film on the surface of the substrate at a loading of 16%. In fact, the degree of substrate oxidation was so severe that the structural integrity of the filter was significantly impaired. The filter then was removed from the permanganate bath and was exposed to a stream of ambient temperature air to dry the filter. X-ray diffraction analysis of the filter substrate demonstrated that the manganese oxide coating was almost entirely amorphorous. The compositions produced by these two techniques clearly are different.

While certain specific embodiments of the invention have been described with particularity herein, it will be recognized that various modifications thereof will occur to those skilled in the art. Therefore, the scope of the invention is to be limited solely by the scope of the appended claims.

What is claimed is:

1. A method for removing organic reduced sulfur-containing compounds from an air stream comprising:
   (a) providing a foraminous filter useful for removing particulates from a gas being flowed therethrough having impregnated therein manganese dioxide, said manganese dioxide obtained by oxidizing in-situ precipitated manganese (II) hydroxide, said manganese dioxide being active for removal of said organic reduced sulfur-containing compounds, and
   (b) forming an air stream containing said organic reduced sulfur-containing compounds through said filter to remove said organic reduced sulfur-containing compounds from said air stream.

2. A method for removing organic reduced sulfur-containing compounds from an air stream comprising:
   (a) providing a foraminous filter useful for removing particulates from a gas being flowed therethrough having impregnated therein manganese dioxide, said manganese dioxide obtained by oxidizing in-situ precipitated manganese (II) hydroxide, prepared by reacting manganese (II) ions with ammonia, said manganese dioxide being active for removal of said organic reduced sulfur-containing compounds, and
   (b) flowing an air stream containing said organic reduced sulfur-containing compounds through said filter to remove said organic reduced sulfur-containing compounds from said air stream.

3. The method of claim 2 wherein the manganese (II) hydroxide is oxidized using air.

4. The method of claim 2 wherein the manganese (II) ions are provided using an aqueous solution of manganese (II) sulfate.

5. The method of claim 4 wherein the ammonia is provided using an aqueous solution of ammonia.

* * * * *